United States Patent [19]
Sharp et al.

[11] Patent Number: 6,141,069
[45] Date of Patent: *Oct. 31, 2000

[54] LIQUID CRYSTAL PHASE MODULATOR USING A FERROELECTRIC LIQUID CRYSTAL WITH A ROTATABLE AXIS AND CHOLESTERIC CIRCULAR POLARIZERS

[75] Inventors: Gary D. Sharp; Kristina M. Johnson, both of Boulder; Jay E. Stockley, Broomfield, all of Colo.

[73] Assignee: University Technology Corporation, Boulder, Colo.

[*] Notice: This patent is subject to a terminal disclaimer.

[21] Appl. No.: 08/851,521

[22] Filed: May 5, 1997

Related U.S. Application Data

[63] Continuation of application No. 08/282,660, Jul. 27, 1994, Pat. No. 5,627,666.

[51] Int. Cl.[7] .................................................. G02F 1/1335
[52] U.S. Cl. ............................. 349/98; 349/198; 349/18
[58] Field of Search ............................. 349/78, 75, 98, 349/18, 116, 194, 198, 171

[56] References Cited

U.S. PATENT DOCUMENTS

| | | | |
|---|---|---|---|
| 4,073,571 | 2/1978 | Grinberg et al. | 349/194 |
| 4,726,663 | 2/1988 | Buzak | 350/347 |
| 4,779,959 | 10/1988 | Saunders | 350/346 |
| 4,991,924 | 2/1991 | Shankar et al. | 350/96.15 |
| 5,050,966 | 9/1991 | Berman | 359/38 |
| 5,150,236 | 9/1992 | Patel | 359/71 |
| 5,168,383 | 12/1992 | Iwaki et al. | 359/71 |
| 5,193,015 | 3/1993 | Shanks | 359/53 |
| 5,221,982 | 6/1993 | Faris | 359/93 |
| 5,235,443 | 8/1993 | Barnik et al. | 359/37 |
| 5,301,045 | 4/1994 | Miller et al. | 359/37 |
| 5,305,129 | 4/1994 | Fujiwara et al. | 359/67 |
| 5,325,218 | 6/1994 | Willet et al. | 349/98 |
| 5,361,320 | 11/1994 | Liu et al. | 385/143 |
| 5,381,253 | 1/1995 | Sharp et al. | 359/53 |
| 5,548,422 | 8/1996 | Conner et al. | 349/98 |
| 5,555,114 | 9/1996 | Narita et al. | 349/98 |
| 5,619,355 | 4/1997 | Sharp et al. | 349/78 |
| 5,627,666 | 5/1997 | Sharp et al. | 349/74 |
| 5,781,268 | 7/1998 | Liu et al. | 349/198 |

OTHER PUBLICATIONS

Biernacki, P. et al. (1991), "Polarization Dependence and Uniformity of FLC Layers for Phase Modulation," Proceedings of SPIE Conf.: Liquid Crystal Devices and Materials, San Jose, CA, Feb. 27, 1991, pp. 167–178.

Evans, J.W. (1949), "Birefringent Filter," J. Opt. Soc. Amer. 39(3):229–242.

Mosini, F. amd Tabiryan, N.V. (1993), "Cholesteric Liquid Crystal Resonators and Systems with Addressable Colors," SPIE Display Systems 1988:28–33.

Title, A.M. and Rosenberg, W.J. (1981), "Tunable birefringent filters," Opt. Eng. 20(6):815–823.

van de Stadt, H. and Muller, J.M. (1985), "Multimirror Fabry–Perot interferometers," J. Opt. Soc. Am. A 2(8):1363–1370.

*Primary Examiner*—Kenneth Parker
*Attorney, Agent, or Firm*—Fleshner & Kim, LLP

[57] ABSTRACT

This invention provides a phase modulator comprising an electro-optically rotatable smectic liquid crystal half-wave retarder in combination with a cholesteric liquid crystal circular polarizer. Rotation of the half-wave retarder varies the phase delay of the modulator. A polarizing interferometer is provided utilizing the phase modulator of this invention in combination with a second cholesteric circular polarizer and a linear polarizer. A tunable Fabry-Perot resonator which does not require ordinary mirrors is provided utilizing the phase modulator of this invention in combination with a second cholesteric circular polarizer.

20 Claims, 11 Drawing Sheets

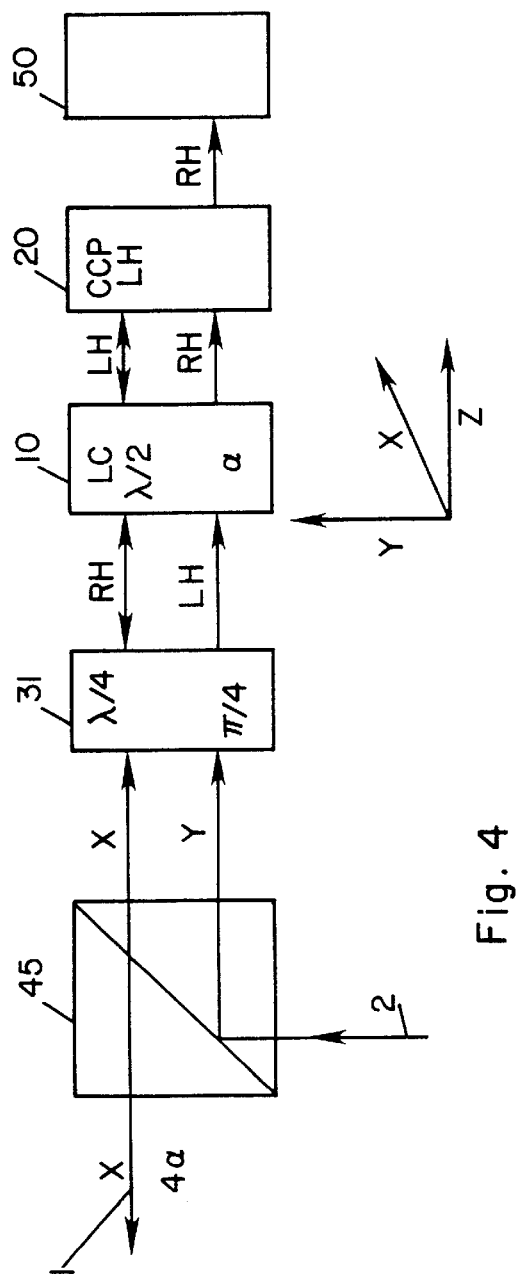
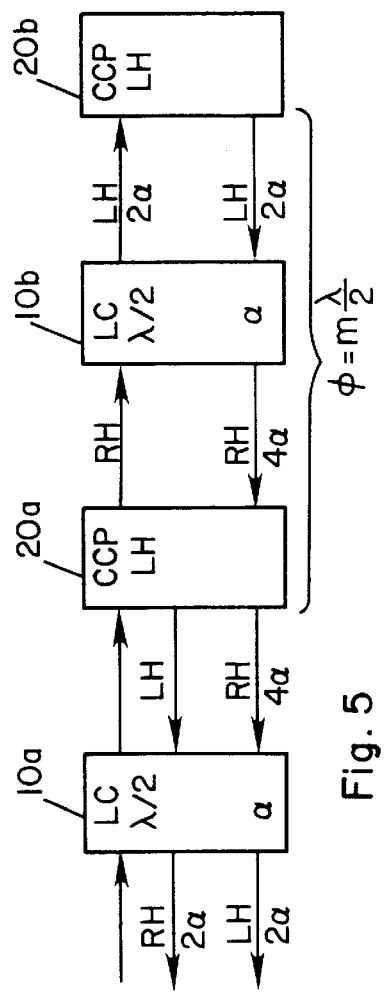
Fig. 4
Fig. 5

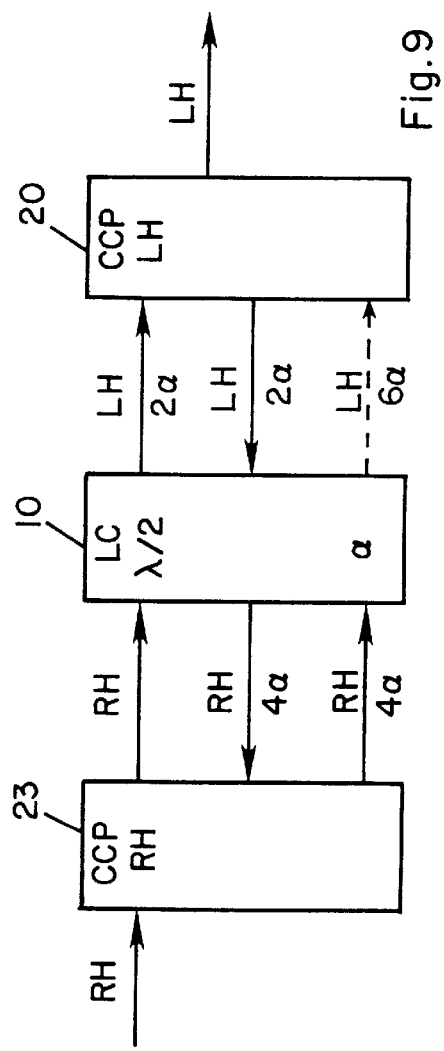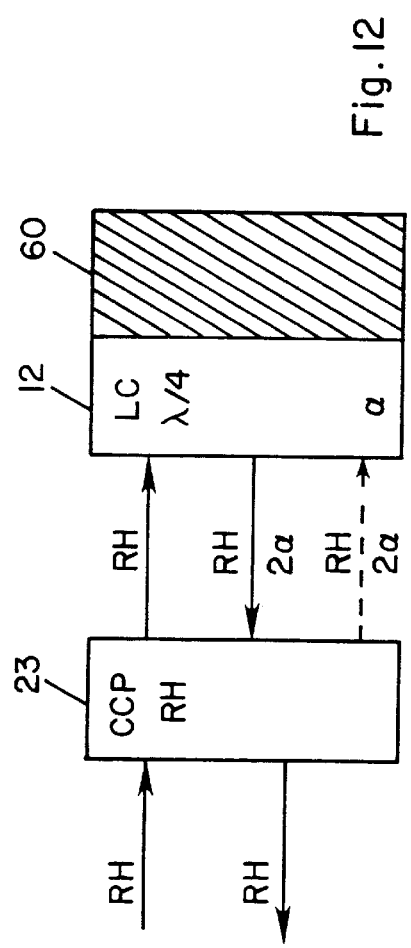

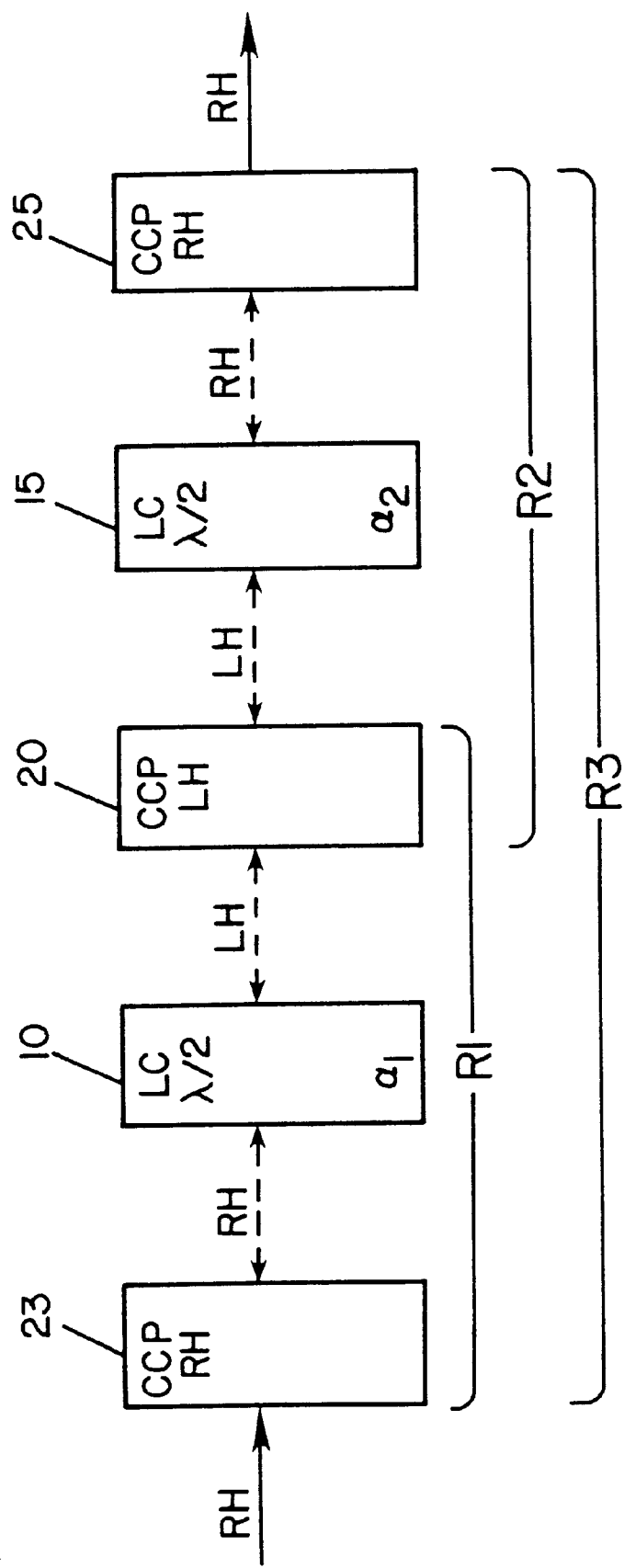

LIQUID CRYSTAL PHASE MODULATOR USING A FERROELECTRIC LIQUID CRYSTAL WITH A ROTATABLE AXIS AND CHOLESTERIC CIRCULAR POLARIZERS

CROSS-REFERENCE TO RELATED APPLICATIONS

This application is a continuation of U.S. patent application Ser. No. 08/282,660, filed Jul. 27, 1994 now U.S. Pat. No. 5,627,666 which is incorporated by reference in its entirety herein.

FIELD OF THE INVENTION

This invention relates to phase modulation by smectic liquid crystals in combination with cholesteric liquid crystals, and to polarizing interferometers and Fabry-Perot resonators utilizing liquid crystal phase modulation.

BACKGROUND OF THE INVENTION

Optical phase modulation is utilized in a myriad of devices for application in spectroscopy, ellipsometry, displays, beam steering, diffractive optics spatial light modulation, switches, tunable filters and optical signal processing. Phase shifting can be provided by nematic liquid crystals upon application of an electric field. However, the response times are on the order of milliseconds. Chiral smectic liquid crystals (CSLCs) provide response times on the order of microseconds. However, in planar aligned cells (smectic layers oriented perpendicular to the substrate walls), application of an electric field perpendicular to the cell walls reorients the molecular directors in a plane parallel to the cell walls, providing electro-optic rotation of the optic axis of the cell, but not providing variable birefringence. Thus planar-aligned CSLCs cannot, on their own, provide analog phase modulation.

Phase modulation can be achieved with a planar-aligned CSLC quarter-half-quarter variable retarder, comprising a CSLC rotatable half-wave plate and two passive quarter-wave plates positioned in series with and on either side of the half-wave plate (U.S. Pat. No. 5,381,253, which is incorporated by reference herein in its entirety). For linearly polarized light the polarization is preserved and pure phase modulation is achieved when the quarter-wave plates are oriented at 45° to the axis of polarization. For an orientation of the optic axis of the half-wave plate at an electro-optically rotatable angle $\alpha$ with respect to the polarization, the phase shift is $2\alpha$.

Variable retardance can also be provided by CSLCs in the homeotropic alignment, wherein the smectic layers are parallel to the cell walls. Application of an electric field parallel to the cell walls rotates the molecular directors in a plane perpendicular to the cell walls. This provides variable retardance with a fixed orientation of the optic axis. In this respect, homeotropically aligned CSLCs are similar in function to nematic liquid crystals, but with at least two orders in magnitude shorter response times. Because of the use of lateral electrodes, the aperture of homeotropically aligned cells is limited.

One particular application of phase modulators is within a Fabry-Perot etalon. In a Fabry-Perot resonance cavity, transmission depends on satisfying the resonance condition that the round-trip phase delay equal an integral number of wavelengths of intracavity light. At resonance the reflected waves from each pass through the cavity interfere constructively and the light is transmitted. Tuning the phase delay within the cavity tunes the resonant wavelengths of light. A Fabry-Perot cavity requires two reflective surfaces. Typically these are ordinary mirrors comprised of dielectric stacks which add to the fabrication complexity and expense of the modulator.

SUMMARY OF THE INVENTION

This invention provides a smectic liquid crystal phase modulator comprising an electro-optically rotatable smectic liquid crystal half-wave retarder in combination with a cholesteric liquid crystal circular polarizer (CCP). For circularly polarized light incident on the half-wave plate, the device is a reflection-mode phase modulator.

A Fabry-Perot resonator with tunable intra-cavity phase is further provided by this invention. The resonator comprises the phase modulator of this invention in combination with a second CCP, of opposite handedness from the first CCP, positioned on the opposite side of the half-wave plate from the first CCP. Reflection by the CCPs is used to create a resonance cavity without the need for separate mirrors, thus providing an advantage in simplicity and economy over tunable Fabry-Perot resonators known in the art. This invention also includes reflection-mode and polarization-independent embodiments of the Fabry-Perot resonator. Also described is a Fabry-Perot interferometer employing one ordinary mirror and one CCP. An ordinary mirror is one, such as a dielectric stack or metal, which changes the handedness of circularly polarized light on reflection.

This invention further provides a polarizing interferometer comprising the phase modulator of this invention in combination with a linear polarizer and a second CCP, of the same handedness as the first CCP, positioned on the opposite side of the half-wave plate from the first CCP. The polarizing interferometer can be used as a Lyot-type polarization interference filter.

To generate circularly polarized light incident on the phase modulator and to linearly analyze light reflected from the modulator, a linear polarizer and a quarter-wave plate oriented at ±45° to the polarizer can be used in combination with the phase modulator. Use of this configuration in an optically addressed spatial light modulator (SLM) is illustrated in this invention.

The liquid crystal cells utilized in this invention have optic axes which are rotatable upon application of an electric field. This function can be provided by many smectic liquid crystal cells known in the art. For example, discrete switching between two or more orientations of the half-wave plate can be provided by planar-aligned SmC* or antiferroelectric liquid crystal cells. For analog phase tuning, planar-aligned SmA* or distorted helix ferroelectric (DHF) liquid crystal cells can be used. The liquid crystals can be dispersed in a polymer. To increase the tuning range, more than one smectic liquid crystal cell can be used in series, preferably with optic axes rotatable in opposite directions.

BRIEF DESCRIPTION OF THE DRAWINGS

FIG. 4 is one pixel of an optically addressed spatial light modulator utilizing the phase modulator of FIG. 1.

FIG. 5 is a phase modulator for unpolarized light utilizing two of the phase modulators of FIG. 1 in series.

FIG. 9 is a transmission-reflection mode Fabry-Perot resonator comprising a smectic liquid crystal half-wave plate sandwiched between two partially reflecting cholesteric circular polarizers.

FIG. 11, comprising

FIG. 12 is a reflection-only mode Fabry-Perot resonator comprising a smectic liquid crystal quarter-wave retarder and a cholesteric circular polarizer.

FIG. 14 is two cascaded Fabry-Perot resonators which share a cholesteric circular polarizer between them.

FIG. 15, comprising

DETAILED DESCRIPTION OF THE PREFERRED EMBODIMENTS

Figure 1:
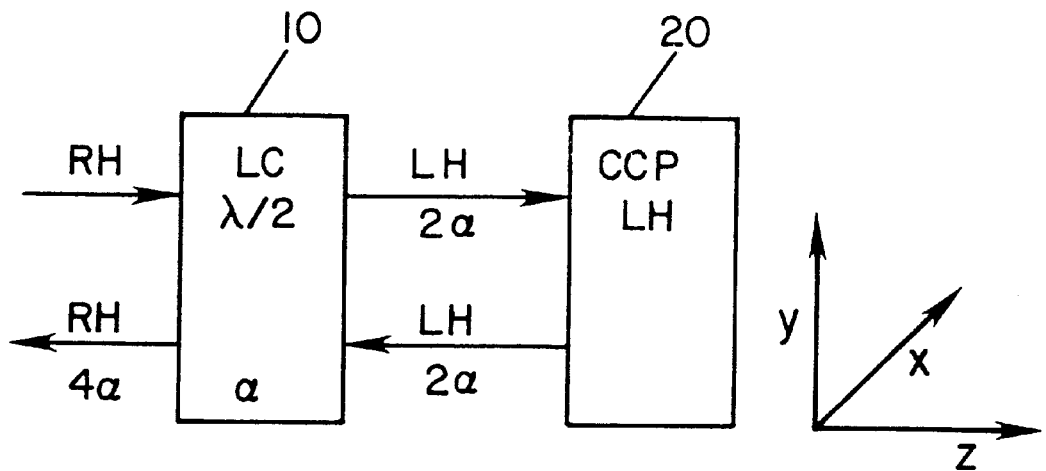
FIG. 1 is a phase modulator comprising a smectic liquid crystal half-wave plate and a cholesteric circular polarizer.

Cholesteric liquid crystals are characterized by a helical pitch, which is the distance through the film required for the molecular directors to trace a full 360° cycle. Reflection of light is observed when the handedness of the incident polarization matches the helical sense of the cholesteric and when the wavelength ($\lambda$) divided by the refractive index (n) of the cholesteric, is approximately equal to the pitch ($\rho$). Cholesteric liquid crystals can form cholesteric circular polarizers which break polarized or unpolarized light into right-handed and left-handed circularly polarized components. The component with the same handedness as the cholesteric is reflected when the wavelength falls within the reflection band, and transmitted at other wavelengths. The component with opposite handedness is transmitted at all wavelengths. In contrast to reflection from ordinary mirrors, the reflected light does not undergo a 180° phase shift. Liquid crystal cholesterics are also described in U.S. Pat. No. 5,619,355, which is incorporated by reference herein in its entirety.

Liquid crystal molecules can be linked as a side chain to a polymer backbone to produce structures with the optical properties of liquid crystals and the glassy state of polymers. Cholesteric liquid crystal side chain polymers can be produced in a glassy state. The polymer can also be coated on a variety of surfaces.

Referring now to the drawings, like reference numerals identify like elements and the same reference numeral appearing in more than one drawing refers to the same element. The term position refers to the position of an element with respect to the light propagation axis (z axis). Orientation refers to the orientation, with respect to the y axis, of the projection of the optic axis in the plane orthogonal to the light propagation axis (x-y plane). Rotation of the optic axis of planar aligned SmA* and SmC* liquid crystals falls approximately within the x-y plane. One skilled in the art can adapt these devices to light at non-normal incidence or to orientations not in the plane orthogonal to the light propagation axis.

Linear polarizers are represented by an arrow showing the axis of polarization or, for a polarizer orthogonal to the plane of the paper, by a dot within a circle within a rectangular box. Cholesteric circular polarizers are represented by boxes with the handedness of the reflection band listed at the top. The handedness of a CCP refers to the handedness which is reflected.

Retarders are represented by boxes with the retardance listed at the top and the orientation of the optic axis listed at the bottom. A rotatable retarder is a retarder with a rotatable orientation of the optic axis. Smectic liquid crystal retarders are labeled LC at the top and have a rotatable orientation $\alpha$. A laboratory frame is required to define the angle $\alpha$. For circularly polarized light, the polarization does not provide a physical reference for a Cartesian coordinate system in which to define $\alpha$. The z axis is defined herein as the light propagation axis, and the orientation of the y axis is arbitrary. The angle $\alpha$ and the orientation of the optical elements are defined with respect to the y axis, and both the input and output phase are referenced to the chosen laboratory frame. Since the measurable quantity is the change in phase, as opposed to the absolute phase, the arbitrary orientation of the y axis is irrelevant to the measured relative phase delay.

Arrows drawn between the optical elements illustrate light propagation in the devices. They are not part of the devices and exemplify, but do not limit, the manner in which the devices can be used. The polarization of the light is written above the arrow, using RH for right-handed circular polarization, LH for left-handed circular polarization, and x or y for linear polarization along the x or y axis, respectively. The term right-handed light is used for right-handed circularly polarized light. When the polarization is not specified the light is either unpolarized or has an arbitrary polarization. The term general polarization refers to light with an arbitrary elliptical polarization and is used to distinguish over light of a specific polarization. The variable retardance of the light due to modulation by the smectic liquid crystal cells is written below the arrow. The constant absolute phase change due to the optical elements is not included. For clarity, the incident and reflected rays are generally shown spatially separated; in fact, they can overlap.

In the illustrated devices, the optical elements are optically coupled in series. Elements are referred to as optically coupled when a light propagation axis traverses them. Transmission mode refers to light output at the opposite end from the incident light and reflection mode refers to light output at the same end.

The phase modulators of this invention exploit the retardance of circularly polarized light by a half-wave plate. When circularly polarized light encounters a wave plate with fixed half-wave retardance and rotatable orientation, it accumulates a phase delay which is a function of the orientation. This is demonstrated with Jones matrix algebra as follows. The operation of a half-wave retarder with optic axis oriented at angle $\alpha$ on right-handed circular polarized light is expressed as the product of the Jones matrix for the retarder and the Jones vector for the light:

Thus right-handed light accumulates a fixed $\pi/2$ absolute phase delay, a variable $2\alpha$ relative phase delay, and is converted to left-handed light. Conversely, left-handed light acquires $-2\alpha$ a relative phase and is converted to right-handed light.

$$W\left(\frac{\lambda}{2}, \alpha\right) E_R = \begin{pmatrix} -i\cos 2\alpha & -i\sin 2\alpha \\ -i\sin\alpha & i\cos 2\alpha \end{pmatrix} \frac{1}{\sqrt{2}} \begin{pmatrix} 1 \\ i \end{pmatrix}$$

$$= -ie^{i2\alpha} \frac{1}{\sqrt{2}} \begin{pmatrix} 1 \\ -i \end{pmatrix} = -ie^{i2\alpha} E_L$$

$$= e^{-i\pi/2} e^{i2\alpha} E_L$$

The phase modulator of this invention (FIG. 1) comprises smectic liquid crystal rotatable half-wave retarder 10 and left-handed CCP 20. Upon application of an electric field to the liquid crystal cell, the optic axis rotates by an angle $\alpha$. The electric field can be applied by any electrode configuration which produces an electric field with a component perpendicular to the cell walls. For incident right-handed circularly polarized light, the phase modulator operates in reflection-mode as follows. Liquid crystal half-wave plate 10 switches the handedness of the incident light and provides a $2\alpha$ phase delay. Left-handed CCP 20 reflects the left-handed light while preserving its handedness. For the light propagating in the reverse direction, the relative orientation of half-wave plate 10 is $-\alpha$. Thus, the reflected left-handed light is converted to right-handed light by half-wave plate 10 and accumulates an additional $2\alpha$ a phase delay. The modulated light exits the device as right-handed circularly polarized light with a variable $4\alpha$ a phase delay. In addition the modulator provides a fixed absolute phase delay $\phi$.

Liquid crystal cell 10 is a half-wave retarder for the modulated light. If the light has a range of wavelengths, the retarder is preferably an achromatic or zero-order half-wave retarder. Liquid crystal achromatic compound retarders are described in U.S. patent application Ser. No. 08/419,593, filed Apr. 7, 1995, which is incorporated by reference herein in its entirety. Liquid crystal achromatic polarization rotators are described in U.S. patent application Ser. No. 08/549,963, filed Oct. 30, 1995, which is incorporated by reference herein in its entirety. Cholesteric circular polarizer 20 has a reflection band which includes the range of wavelengths of modulated light. To increase the operating wavelength range, multiple CCPs with different reflection bands can be used.

For general polarized light, the phase modulator of FIG. 1 is both a circular polarizer and a phase modulator. General polarized light incident on liquid crystal half-wave plate 10 can be resolved into left-handed and right-handed components. The right-handed component is modulated as described above and exits in the reflected direction with right-handed circular polarization and a phase delay of $4\alpha$. The left-handed component is converted into right-handed light by the half-wave plate and is consequently transmitted by left-handed CCP 20.

Similarly, for unpolarized light incident on the half-wave plate, the phase modulator of FIG. 1 is both a circular polarizer and a phase modulator. The incident light remains unpolarized after passing through half-wave plate 10. CCP 20 circularly polarizes the light and reflects a left-handed circularly polarized beam. The reflected left-handed beam receives a $2\alpha$ phase delay from half-wave plate 10 and exits as right-handed circular polarized light.

For general polarized light incident on CCP 20, as opposed to on half-wave plate 10, the left-handed component is reflected by the CCP and the right-handed component is coupled into the device. This component receives a $-2\alpha$ phase delay from half-wave plate and is converted to left-handed light, which exits the device without reflection. Similarly, for unpolarized light incident on CCP 20 a portion is converted into right-handed light, which is switched to left-handed light and receives a $-2\alpha$ phase delay from half-wave plate 10.

In the methods described above for using the phase modulator of FIG. 1, the common aspects of the function are that CCP 20 circularly polarizes or circularly analyzes light, and that half-wave plate 10 imparts a phase delay to circularly polarized light, where the phase delay is a function of the tunable orientation o t of the half-wave plate.

Figure 2:
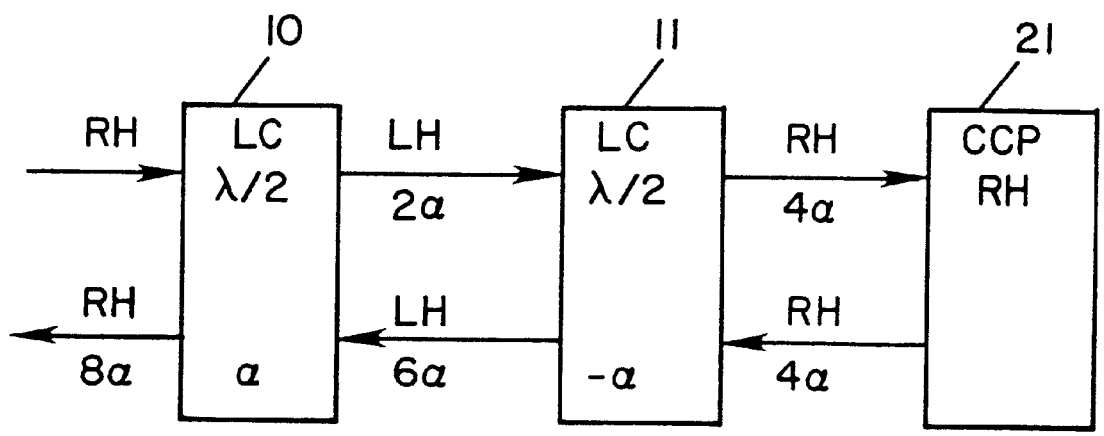
FIG. 2 is a phase modulator comprising a pair of smectic liquid crystal half-wave plates and a cholesteric circular polarizer.

With currently available SmA* liquid crystals the maximum tilt angle available is approximately $\pm 25°$, providing a maximum a of $50°$. Thus the maximum phase retardation available with the modulator of FIG. 1 is $4\alpha=200°$, which is greater than $\pi$. To achieve a full $2\pi$ modulation, a compound half-wave retarder, comprising two liquid crystal half-wave plates in series, can be employed, as shown in FIG. 2. Liquid crystal half-wave plate 10 is oriented at $\alpha$ and liquid crystal half-wave plate 11 is oriented at $-\alpha$. The liquid crystal cells are followed by right-handed CCP 21. For right-handed incident light, the phase modulator of FIG. 2 operates in reflection-mode to provide $8\alpha$ phase delay as shown. Note that because the additional half-wave plate reverses the handedness of light at the CCP, element 21 is a right-handed rather than a left-handed CCP.

An exemplary phase modulator as in FIG. 1 was constructed using a BDH 764E (British Drug House) 1.85 $\mu$m thick cell in the SmA* phase as a zero-order half-wave plate. The cell was operated at room temperature, at which the maximum tilt angle is $\pm 12°$ and the maximum rotation is a $\alpha=24°$. A left-handed CCP was formed from a low molecular weight liquid crystal composed of a nematic compound ZLI 2140-100 (Merck) and a levo chiral dopant ZLI 811 (Merck). The device was approximately 8 microns thick and reflected left-hand circularly polarized light over the wavelength band 618 nm to 638 nm. Linearly polarized HeNe laser light at 632.8 nm was incident on the half-wave retarder and the SmA* tilt angle was varied by applying a 10 V amplitude sinusoidal field at 1 Hz frequency. The frequency can be increased to over 50 kHz, but for observation purposes 1 Hz was used. The phase shift in the modulated beam varied in proportion to the applied field and the maximum phase shift was measured by interference with a reference beam to be approximately $79°$. Since the phase shift of the device is $4\alpha$, this corresponds to $\alpha=20°$, which corresponds to a maximum tilt angle of $\pm 10°$, within the experimental accuracy of the expected value for this SmA* material.

The liquid crystal cells of this invention can alternatively be constructed within an optical fiber waveguide having an active liquid crystal core, as described in U.S. Pat. No. 5,361,320, which is hereby incorporated by reference in its entirety herein. The cholesteric liquid crystals can also be contained within the core of an optical fiber. Polymeric CCPs can be positioned on the ends of optical fibers, or within the core.

Figure 3:
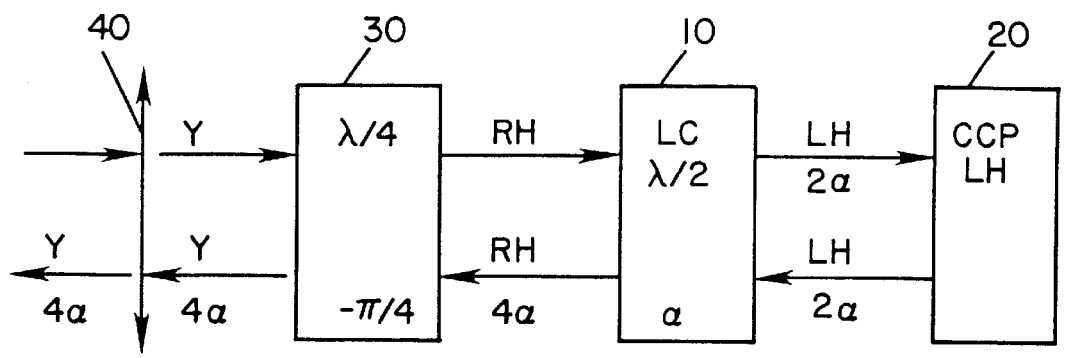
FIG. 3 is the phase modulator of FIG. 1 in combination with a circular polarizer comprising a linear polarizer and a quarter-wave plate.

The phase modulator is illustrated in FIGS. 1 and 2 with circularly polarized light. The device can also include a means for providing circularly polarized light, as illustrated in FIG. 3. Linear polarizer 40 polarizes incident light along the y axis. Quarter-wave plate 30 is oriented at $-\pi/4$ to convert the linearly polarized light into right-handed circularly polarized light. An orientation of $+\pi/4$ is used when left-handed light is required. Liquid crystal half-wave plate 10 and CCP 20 operate as described above. On the reflected pass, quarter-wave plate 30 converts the phase modulated right-handed light back into linear light, which is then transmitted by the linear polarizer.

Application of the phase modulator of this invention in an optically addressed light modulator is illustrated in FIG. 4. It exploits the ability of CCP 20 to reflect a left-handed modulated beam and simultaneously transmit a right-handed addressing signal to a photosensor. In this figure, light propagation path 1 represents the path of both the incoming beam and the reflected, modulated, beam. Light propagation path 2 represents the optical addressing signal. The two lines can be spatially overlapping but are shown separated for illustration. Cube beamsplitter 45 couples both beams 1 and 2 into the phase modulator. For unpolarized input light, cube 45 can be a polarizing beamsplitter. Quarter-wave plate 31 converts the light into circularly polarized beams of opposite handedness. Beam 1 is converted into right-handed light by the quarter-wave plate. It then receives a $4\alpha$ phase delay from the phase modulator comprising liquid crystal half-wave plate 10 and CCP 20. The phase modulated light is reflected out of the device, along path 1, through quarter-wave plate 31 and cube 45. In contrast, optical addressing beam 2 is converted into left-handed light by quarter-wave plate 31. Half-wave plate 10 reverses the polarity to right-handed light, which is transmitted by left-handed CCP 20 onto photosensor 50. Alternatively, addressing beam 2 can have a wavelength outside of the reflection band of CCP 20 so that it is transmitted to sensor 50 regardless of its polarization. In another alternative configuration, the addressing beam impinges directly onto sensor 50 from the back side of the array. Sensor 50 is electronically connected with liquid crystal half-wave plate 10, to vary $\alpha$ in response to the addressing signal. The photosensor can be, for example, an amorphous semiconductor (such as a-Si:H, CdS, CdSe) in a photodiode or photoconductor configuration, a crystalline semiconductor such as GaAs or silicon, or a III–V multiple quantum well detector. The optically addressed modulator of FIG. 4 can be a single pixel in a multiple pixel spatial light modulator.

A polarization-independent embodiment of the phase modulator is illustrated in FIG. 5. It utilizes a first phase modulator, comprised of liquid crystal half-wave plate 10a and CCP 20a, in series with a second phase modulator, comprised of liquid crystal half-wave plate 10b and CCP 20b. Unpolarized light incident on half-wave plate 20a remains unpolarized. CCP 20a circularly polarizes the light and reflects the left-handed component while transmitting the right-handed component. The reflected, left-handed, component is converted to right-handed light by half-wave plate 10a and accumulates $2\alpha$ of phase. The right-handed component, which was transmitted by CCP 20a, is converted to left-handed light and receives $2\alpha$ phase delay from half-wave plate 10b. CCP 20b reflects the light back through half-wave plate 10b, where it is converted to right-handed light and accumulates an additional $2\alpha$ phase delay. CCP 20a transmits this light back to half-wave plate 10a, which converts is to left-handed light and provides $-2\alpha$ of phase. Thus the net tunable phase delay for both the right-handed and the left-handed components is $2\alpha$. However, the component which is transmitted through CCP 20a has travelled a longer path, through more optical elements, than the component which is reflected by CCP 20a. In order for the two beams to emerge with the same phase delay, the fixed absolute phase accumulated between CCPs 20a and 20b must equal an integral number of half-wavelengths ($\Phi=m\lambda/2$), so that the round trip transit provides and integral number of wavelengths of phase delay.

Figure 6:
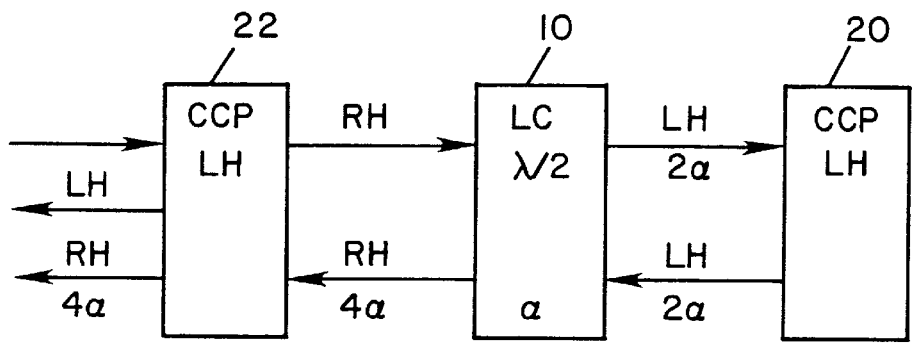
FIG. 6 is a reflection mode complex amplitude modulator employing a smectic liquid crystal half-wave plate sandwiched between two cholesteric circular polarizers.

Addition of a second left-handed CCP to the phase modulator of this invention provides a complex amplitude modulator of polarized or unpolarized light, as shown in FIG. 6. Incoming light is circularly polarized by left-handed CCP 22 and the left-handed component is reflected while the right-handed component is transmitted. The right-handed component accumulates $4\alpha$ phase delay from the reflection-mode phase modulator comprised of liquid crystal half-wave plate 10 and left-handed CCP 20, and is transmitted back through left-handed CCP 22. In this device the left-handed and right-handed components of the incident light acquire different phase delays, changing the state of polarization modulation rather than pure phase modulation.

Figure 7:
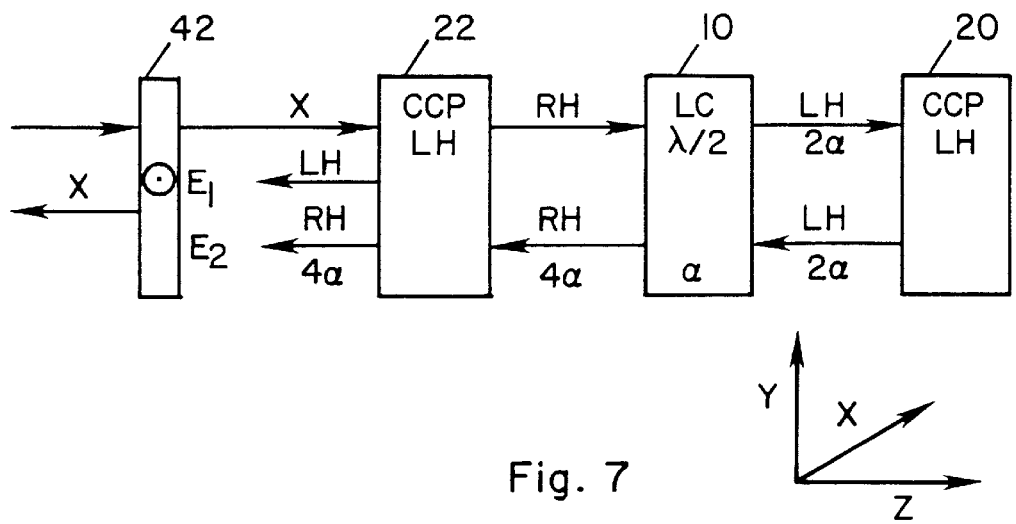
FIG. 7 is a polarizing interferometer comprising the complex amplitude modulator of FIG. 6 in combination with a linear polarizer.

The complex amplitude modulator of FIG. 6 used in combination with a linear polarizer provides the polarizing interferometer of FIG. 7. Linear polarizer 42 provides x polarized light to left-handed CCP 22. The CCP decomposes it into a left-handed component, which is reflected, and a right-handed component, which is transmitted. The components are of equal magnitude. The right-handed component receives $4\alpha$ phase delay from the reflection-mode phase modulator comprising liquid crystal half-wave plate 10 and left-handed CCP 20. The left-handed component, $E_1$, and the phase delayed right-handed component, $E_2$, interfere at polarizer 42 to produce an x polarized output beam. The electric fields $E_1$ and $E_2$ are $$E_1 = \frac{1}{\sqrt{2}}\left[\frac{1}{\sqrt{2}}\hat{x} + \frac{1}{\sqrt{2}}i\hat{y}\right]$$

$$E_2 = \frac{1}{\sqrt{2}}\left[\frac{1}{\sqrt{2}}\hat{x} - \frac{1}{\sqrt{2}}i\hat{y}\right]e^{i[4\alpha+2\phi]}.$$

The x component of the sum of the $E_1$ and $E_2$ is $$E_x = E_{1x} + E_{2x} = \frac{1}{2}[1 + e^{i(4\alpha+2\phi)}].$$

The transmitted intensity is $|E_x|^2$, $$T = \frac{1}{4}[1 + 1 + e^{i(4\alpha+2\phi)} + e^{-i(4\alpha+2\phi)}]$$

$$= \cos^2[\phi + 2\alpha]$$

where $\Phi$ is the absolute phase of the path from CCP 22 to CCP 20. Electro-optic control of angle $\alpha$ tunes the wavelength of the transmission peaks.

A polarizing interferometer of this invention was constructed using a BDH 764E (British Drug House) liquid crystal cell. The cell thickness was 1.85 $\mu$m and the liquid crystal was planar aligned in the SmA* phase. Two left-handed CCPs were fabricated by polymerizing a mixture made from Wacker LC Silicones CC4039L and C4070L. The films were approximately 17 and 20 microns thick. These films exhibit selective reflection of left-hand polarized light over the wavelength band 600 nm to 660 nm. A dichroic sheet polarizer was used. As expected, illumination with a HeNe laser at 632.8 nm produced a transmission function showing interference fringes. The fringe period was 15 mm. A 40 V peak to peak sinusoidal voltage at a frequency of 0.5 Hz was applied to the SmA* liquid crystal cell at room temperature, and the fringes were observed to move in an analog fashion with a maximum shift of 4 mm. This corresponds to a phase modulation of 96 degrees, which corresponds to a total rotation of the molecular director of a $\alpha=24°$.

The polarizing interferometer of this invention can be used as the basis for a variety of interference filters. For example, a birefringent element can be positioned between polarizer 42 and CCP 22. A birefringent element with wavelength dependent retardance can be oriented at 45° to the polarizer. Multiple polarizing interferometers of this invention can be connected in series.

Figure 8:
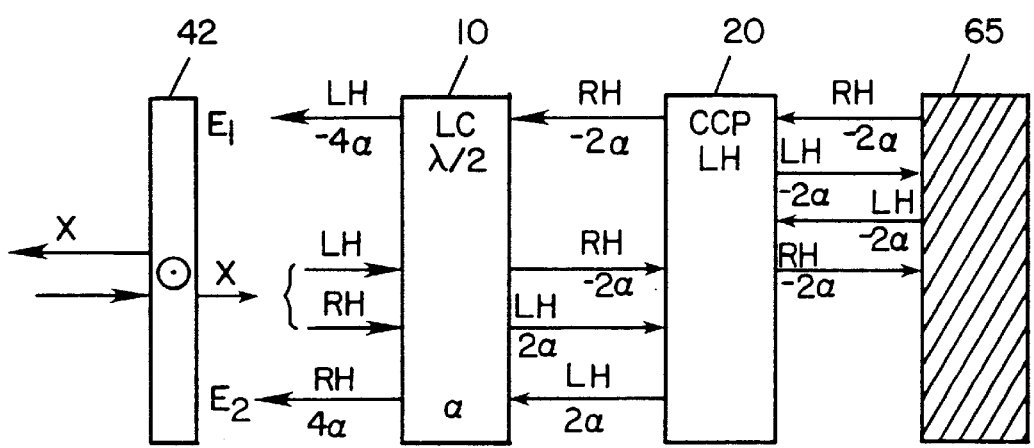
FIG. 8 is a polarizing interferometer using the liquid crystal phase modulator in combination with a linear polarizer and an ordinary mirror.

An embodiment of a polarizing interferometer using an ordinary mirror in combination with the phase modulator is illustrated in FIG. 8. Light received on polarizer 42 becomes linearly polarized along the x-axis, which is equivalent to a combination of right- and left-handed beams. The right-handed beam is phase modulated by rotatable liquid crystal half-wave plate 10 in combination with left-handed CCP 20, as shown in FIG. 1, and emerges with right-handed circular polarization and with $4\alpha$ phase delay ($E_2$ in drawing). The left-handed beam received on half-wave plate 10 is converted to right-handed light and acquires a $-2\alpha$ phase delay. The beam is transmitted by left-handed CCP 20 and then reflected back and forth between CCP 20 and ordinary mirror 65. The handedness is preserved on reflection from the cholesteric but is reversed on reflection from the ordinary mirror. After the second reflection from mirror 65 the beam is right-handed and is therefore transmitted by CCP 20. It acquires another $-2\alpha$ phase delay from half-wave plate 20 and becomes left-handed ($E_1$ in the drawing). This component also has acquired an additional fixed phase delay from the reflections between CCP 20 and mirror 65. As in the interferometer of FIG. 7, beams $E_1$ and $E_2$ interfere at polarizer 42 and emerge as an x-polarized beam with a transmission spectrum which is a function of $\alpha$. In this embodiment the phase difference between $E_1$ and $E_2$ is $8\alpha$, as compared with $4\alpha$ in FIG. 7.

Another way to understand the device of FIG. 8 is as a selective color filter comprising a pair of polarization rotators. The polarization of the x-polarized light transmitted by polarizer 42 is rotated by $2\alpha$ by half-wave plate 20 and remains linearly polarized. The left-handed component of this light is reflected by CCP 20 and the right-handed component is transmitted by CCP 20 and then reflected back and forth between CCP 20 and mirror 65 until a right-handed beam is transmitted through CCP 20. The left- and right-handed beams reflected onto half-wave plate 10 are equivalent to a linearly polarized beam with an angular orientation which is dependent on the relative phase delays of the two components, which in turn is a function of the wavelength of light. Each wavelength of light has its polarization oriented at a different angle, which makes a fan of colors. Half-wave plate 10 selects which wavelength is transmitted by rotating the selected wavelength onto the x-axis and through polarizer 42.

Mirror 65 in FIG. 8 can be replaced by a right-handed CCP. The CCP can provide the same function of receiving a right-handed beams and returning a right-handed beam. With the CCP this is accomplished in a single reflection, as compared to three reflections in the embodiment utilizing an ordinary mirror. To increase the operative spectral range of the filter, CCP 20 can be a stack of cholesteric layers with differing reflection bands.

By exploiting the reflection provided by CCPs, a Fabry-Perot resonator can be constructed using the phase modulator of this invention without the use of ordinary mirrors (FIG. 9). Smectic liquid crystal half-wave plate 10 is positioned between CCPs 20 and 23, of opposite handedness. To form the resonator of this invention, the reflectivity of the CCPs is typically in the range 85–95%. The Fabry-Perot cavity optimally transmits those wavelengths which experience a round-trip phase delay through the cavity equal to an integral number of wavelengths. Electro-optic rotation of the smectic liquid crystal wave-plate varies the intra-cavity phase delay and thus tunes the resonant wavelength. For monochromatic incident light the resonator is an amplitude modulator, and for polychromatic incident light it is a tunable wavelength filter.

The operation of the resonator of FIG. 9 is as follows. Right-handed light is received on right-handed CCP 23 with reflectivity R. When the incident light is not at the cavity resonance wavelength, only 1-R of the light is transmitted by CCP 23, but at resonance essentially all of the light is coupled into the cavity. Half-wave plate 10 reverses the polarization to left-handed and adds $2\alpha$ phase delay. CCP 20 reflects R of the light and preserves the handedness. A second pass through half-wave plate 10 reverses the optical field's polarization back to right-handed and adds $2\alpha$ more phase delay. The round-trip phase delay is thus $4\alpha+2\Phi$, where $\Phi$ is the fixed absolute phase delay of the cavity. R of the right-handed light returning to CCP 23 is reflected back to half-wave plate 10, and the light continues to have multiple internal passes through the cavity, accumulating $4\alpha+2\Phi$ phase with each round trip. For light on resonance, the left-handed rays at CCP 20 constructively interfere and are coupled out of the cavity as left-handed light. Rotation of the liquid crystal retarder tunes the resonance condition and thus varies the amplitude of light of a given wavelength which is transmitted and, for polychromatic light, varies which wavelengths of light are transmitted.

The Fabry-Perot resonator of this invention can be a compact device with a small cavity length. Polymeric CCPs can be directly applied to the substrates which form the cell walls of the liquid crystal half-wave plate. Each cell wall substrate can, for example, be coated with a polymeric CCP, followed by a transparent electrode, followed by a planar alignment layer. Alternatively, the electrode can be on the substrate with the CCP on top of it. An isotropic spacer can also be included within the cavity to increase the optical path length. This provides great flexibility in tailoring the free spectral range of the device to a particular application.

The optical properties of the cholesteric Fabry-Perot filter are modeled as follows. In general, the complex transmission of a Fabry-Perot etalon is given by:

$$t = t_2^+ Q^+ (I - r_1^- Q^- r_2^{30}| Q+)^{-1} t_1^+ \qquad \text{Eq. 1}$$

where $t_{1,2}$ and $r_{1,2}$ are the complex transmission and reflection of the first and second partial reflectors, Q is the Jones matrix for the intracavity structure using a circular basis, and I is the identity matrix. The positive/negative superscript corresponds to the matrix for a positive/negative traveling field.

Due to the circular eigenstates of cholesteric liquid crystal films, it is most convenient to analyze the Fabry-Perot using circular Jones matrices. The intracavity structure is simply a half-wave retarder with a voltage dependent orientation, given by $$Q^+ = e^{i\phi} \begin{pmatrix} 0 & e^{-i2\alpha} \\ e^{i2\alpha} & 0 \end{pmatrix}, Q^- = e^{i\phi} \begin{pmatrix} 0 & e^{i2\alpha} \\ e^{-i2\alpha} & 0 \end{pmatrix} \qquad \text{Eq. 2}$$

where $\phi$ is the single-pass absolute phase of the cavity, and $\alpha$ is the orientation of the optic axis.

The input and output partial reflectors are assumed to be left- and right-handed cholesteric films, respectively, with identical reflectivity, R. It is not required that $r_1 = r_2 = R$, but it is used in this derivation to simplify the mathematics. The matrices describing the transmission of the mirrors are $$t_1^+ = \begin{pmatrix} \sqrt{1-R} & 0 \\ 0 & 1 \end{pmatrix}, t_2^+ = \begin{pmatrix} 1 & 0 \\ 0 & \sqrt{1-R} \end{pmatrix}, \quad \text{Eq. 3}$$

and those describing the reflection are given by $$r_1^- = \begin{pmatrix} \sqrt{R} & 0 \\ 0 & 0 \end{pmatrix}, r_2^+ = \begin{pmatrix} 0 & 0 \\ 0 & \sqrt{R} \end{pmatrix}, \quad \text{Eq. 4}$$

where any phase accumulated on reflection from each mirror is assumed to be included in the single-pass cavity phase, $\phi$.

Substitution of Eqs. 2–4 into the general transmission function of Eq. 1 yields the matrix, $$t = \begin{pmatrix} 0 & t_{RL} \\ t_{LR} & 0 \end{pmatrix}, \quad \text{Eq. 5}$$

where, $$t_{RL} = e^{i(\phi-2\alpha)},$$

and, $$t_{LR} = \frac{(1-R)e^{i(\phi+2\alpha)}}{1 - Re^{i(\phi+4\alpha)}}.$$

Using Eq. 5, a Jones matrix can be derived which propagates the power transmitted in left/right handed polarizations where $T_{RL}$ is $t_{RL}$ times its Hermitian conjugate, and and, $$\begin{pmatrix} P'_L \\ P'_R \end{pmatrix} = \begin{pmatrix} 0 & T_{RL} \\ T_{LR} & 0 \end{pmatrix} \begin{pmatrix} P_L \\ P_R \end{pmatrix}, \quad \text{Eq. 6}$$

$$T_{RL} = 1,$$

$$T_{LR} = \frac{1}{1 + \kappa \sin^2(\phi + 2\alpha)},$$

and, $$\kappa = \frac{4R}{(1-R)^2}.$$

The above result has important implications that warrant some discussion. Since terms only appear in the off-diagonal, light which enters in one handedness exits the structure with the opposite handedness. This is of course a consequence of the action of the half-wave retarder. Another important point is that right-handed incident light is fully transmitted by the structure with only a handedness change. This results from the fact that cholesteric films are polarization sensitive mirrors and are key to producing a polarization insensitive Fabry-Perot filter, as described below. Finally, the left-handed component is seen to be transmitted with the usual Fabry-Perot transmission function, where the resonant wavelength is a function of the half-wave retarder orientation $\alpha$.

Figure 10:
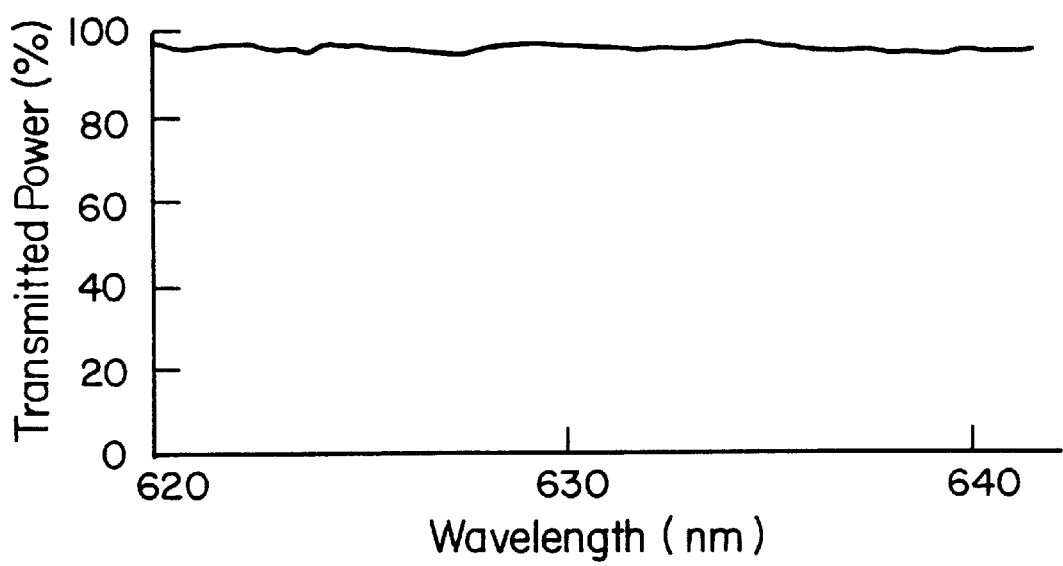
FIG. 10 is a transmission spectrum of the filter of FIG. 9 for left-handed input light.
Figure 11A:
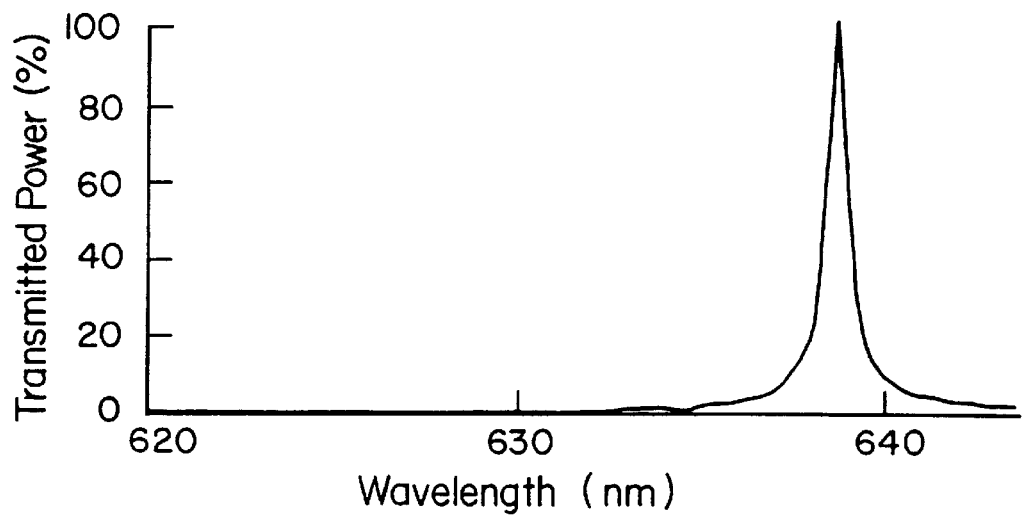
FIGS. 11a–11d, shows the transmission spectra of the filter of FIG. 9 for right-handed input light, with the liquid crystal half-wave retarder at various orientations, $\alpha$.
Figure 11B:
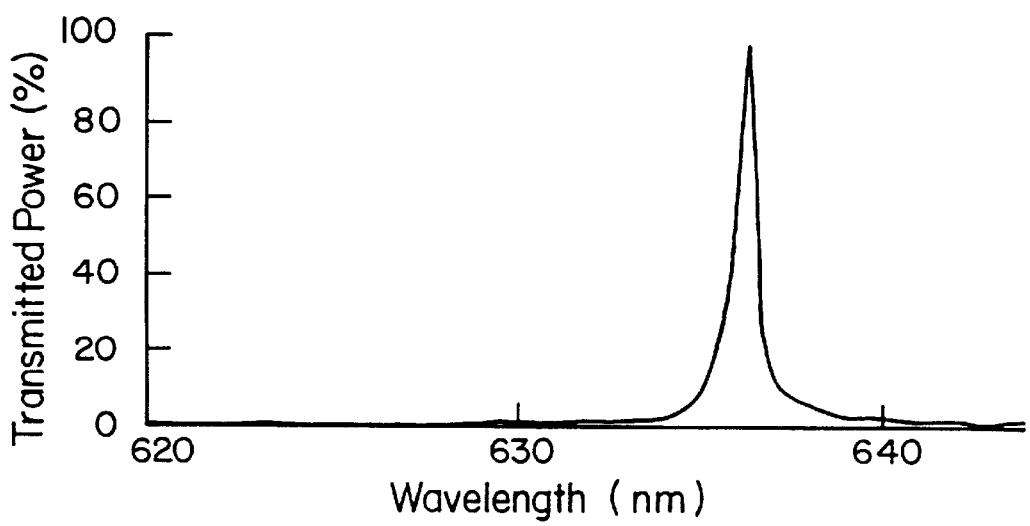
Figure 11C:
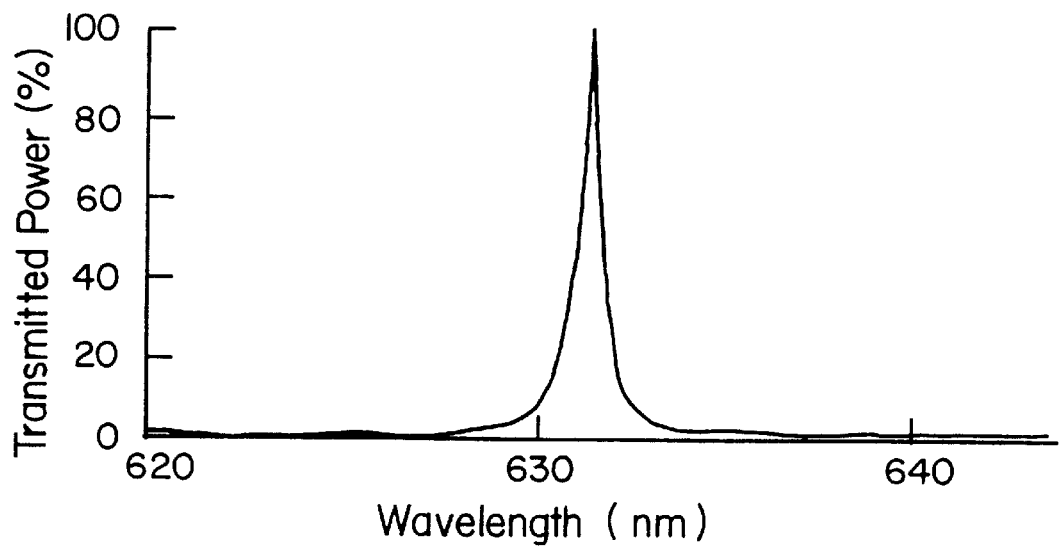
Figure 11D:
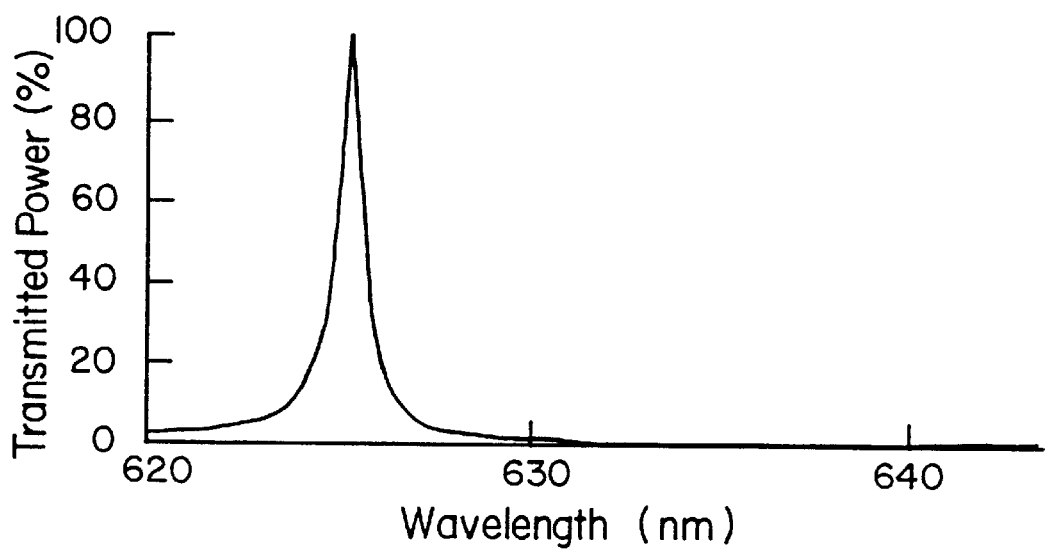

In order to verify that the above equations are accurate, the 4×4 matrix formalism of Berreman was used to model the structure. First, the behavior of the cholesteric was modeled by approximating the helical structure with a series of linear retarders. The orientation of each retarder complies with the pitch of the material, and the birefringence is that provided by the manufacturer. The number of retarders required to accurately approximate the analog winding of the molecules was 12 layers per pitch. Twelve pitches were required to achieve a 95% reflectance. The above results were borne out as shown in FIGS. 10 and 11a, where right-handed light is fully transmitted and left-handed light exhibits fine resonance peaks.

Using exact 4×4 matrix methods, the transmission for incident left-handed light as a function of the orientation of the half-wave retarder was calculated. The results of FIG. 11 verify that the wavelength of peak transmission is shifted, where FSR/2 of tuning is achieved using a 22.5-degree tilt analog material.

A reflection-mode, asymmetric, Fabry-Perot resonator is illustrated in FIG. 12. The resonator provides phase modulation for monochromatic or polychromatic light. Right-handed light is coupled into the resonator through right-handed CCP 23. Instead of the liquid crystal half-wave plate used in the transmission-mode resonator, the reflection-mode resonator uses liquid crystal quarter-wave plate 12 in combination with reflector 60. The reflector can be a mirror or other reflecting means. The reflectivity of the reflector is approximately 100%. A forward and return pass through quarter-wave plate 12 provides a half-wave retardance. This half-wave retardance reverses the handedness of the polarized light. Reflection from mirror 60 also reverses the handedness, so the reflected light is restored to right-handedness with $2\alpha$ phase delay. Thus, the reflection-mode resonator provides half the round-trip phase delay of the transmission-mode resonator and provides an output with the same handedness as the input.

The reflection-mode only resonator provides phase-only modulation of an incident optical beam. To optimize phase modulation, CCP 23 is a partial reflector. For SmA* the reflectivity is typically 50–70%. For a CCP with a pitch of 400 nm, approximately five pitches are required to reflect 60% of light of the correct handedness.

A significant problem with liquid crystal Fabry-Perot filters is their polarization dependence. Polarization-independent modulators, which provide the same modulation for all polarizations of incident light, can employ two resonators in parallel. The embodiments of FIGS. 9 and 12 modulate right-handed incident light. Substituting left-handed CCPs for right-handed CCPs and vice-versa creates resonators for left-handed light. For a parallel polarization-independent modulator, incident light of any arbitrary polarization is resolved into a linear combination of right-handed and left-handed components, for example by utilizing a birefringent element to spatially separate x and y linear polarized light and a quarter-wave plate at $+\pi/4$ to convert the linear light to right-handed and left-handed circular light. The two circular components are then coupled into resonators for the appropriate handedness, and recombined at the output.

Constructing a series polarization-independent modulator is not possible with the liquid crystal Fabry-Perot filters known in the art. A single slab of homogeneous nematic material contained between mirrors produces two independent transmission spectra. The extraordinary linear eigenstate is tunable with the application of an electric field, while the ordinary transmission spectrum is passive. Consequently, devices cannot be cascaded which independently act on orthogonal polarizations.

Figure 13:
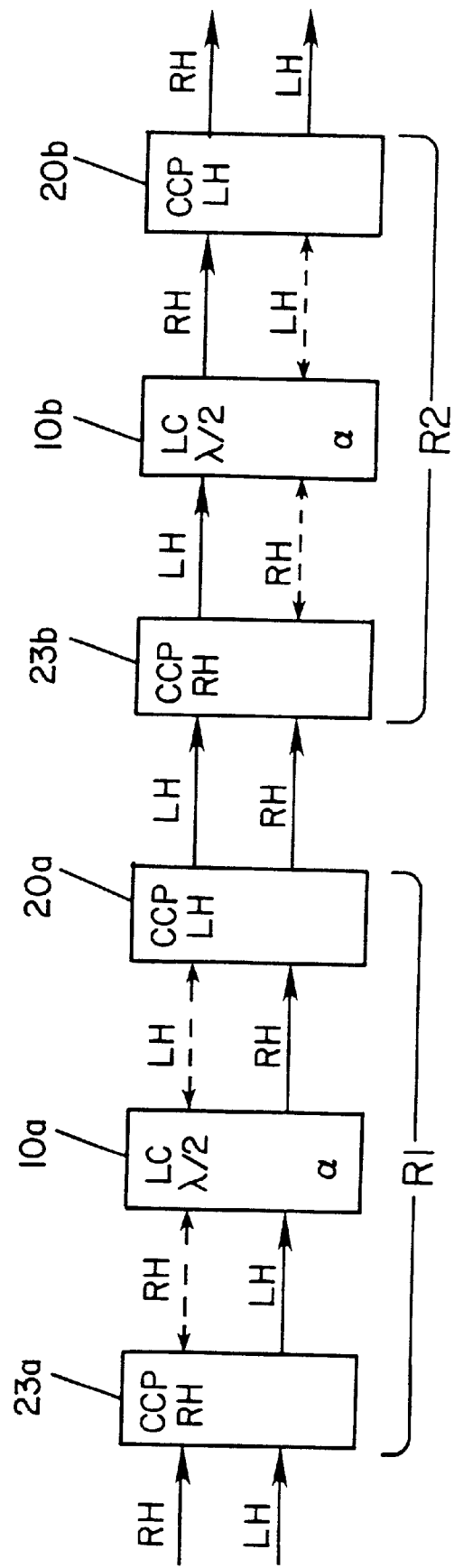
FIG. 13 is a polarization-independent modulator comprising two Fabry-Perot resonators in series.

The series device of this invention allows polarization independent operation by taking advantage of the fact that the mirrors are polarization sensitive. Unlike a usual nematic Fabry-Perot filter, the cholesteric device has no passive ordinary spectrum accompanying the active spectrum. Consequently, the filter acts on one polarization and fully transmits the orthogonal polarization, as demonstrated in FIG. 10. A polarization-independent modulator of this invention is constructed by cascading two transmission-mode resonators, both for the same handedness, in series. The polarization-independent modulator of FIG. 13 comprises two resonators, R1 and R2, for right-handed light, as shown in FIG. 9, in series. In FIGS. 13–15, dotted lines with double arrows indicate multiple reflections within a resonator and solid lines with single arrows indicate a single pass along a light propagation axis. Light of an arbitrary polarization is equivalent to a linear combination of light of two orthogonal combinations and can thus be treated as a right-handed and a left-handed component. The right-handed component incident on the first resonator, R1, of the series device is modulated as illustrated in FIG. 9 and leaves CCP 20a with left-handed polarization. The modulated component is transmitted by right-handed CCP 23b, converted to right-handed polarization by liquid crystal half-wave retarder 10b, and transmitted by left-handed CCP 20b without further modulation. Conversely, the left-handed component incident on the first resonator is transmitted by right-handed CCP 23a, converted to right-handed light by half-wave plate 10a, and transmitted by left-handed CCP 20a. Since the handedness is switched from left to right, a second resonator for right-handed light, R2, comprising CCP 23b, half-wave plate 10b and CCP 20b, is positioned in series to modulate this component.

The matrix associated with the cascaded structure is simply the power transmission matrix of Eq. 6 squared, given by $$\begin{pmatrix} P'_L \\ P'_R \end{pmatrix} = T_{LR}(\lambda, \alpha) I \begin{pmatrix} P_L \\ P_R \end{pmatrix},$$

where again, I is the identity matrix. This equation shows very clearly that the transmission of two identical cascaded cholesteric Fabry-Perot filters is polarization insensitive. Furthermore, these devices can be spliced together with no concern for relative orientation, as the eigenstates are circular. This is particularly advantageous for application to fiber optic switching.

Two resonators can also be cascaded in series not to provide polarization independence, but to provide higher resolution or higher contrast modulation of a single polarization component, as shown in FIG. 14. A first resonator, R1, for right-handed light comprises CCP 23, half-wave plate 10, and CCP 20. Right-handed light incident on CCP 23 is multiply reflected and emerges from CCP 20 with left-handed polarization. A second resonator, R2, for left-handed light, comprising CCP 20, half-wave plate 15 and CCP 25, receives the modulated light from R1 and further modulates it. A third resonator, R3, is formed within CCP 23 and CCP 25. The transmission of the cascaded device is a function of the transmittance of the three resonators, as described by H. van de Stadt and J. M. Muller, J. Opt. Soc. Am. A. (1985)2(8): 1363, which is hereby incorporated by reference in its entirety. The orientations $\alpha_1$ and $\alpha_2$ of liquid crystal half-wave plates 10 and 15 can be independently controlled to tailor the transmission for high resolution or high contrast.

Figure 15A:
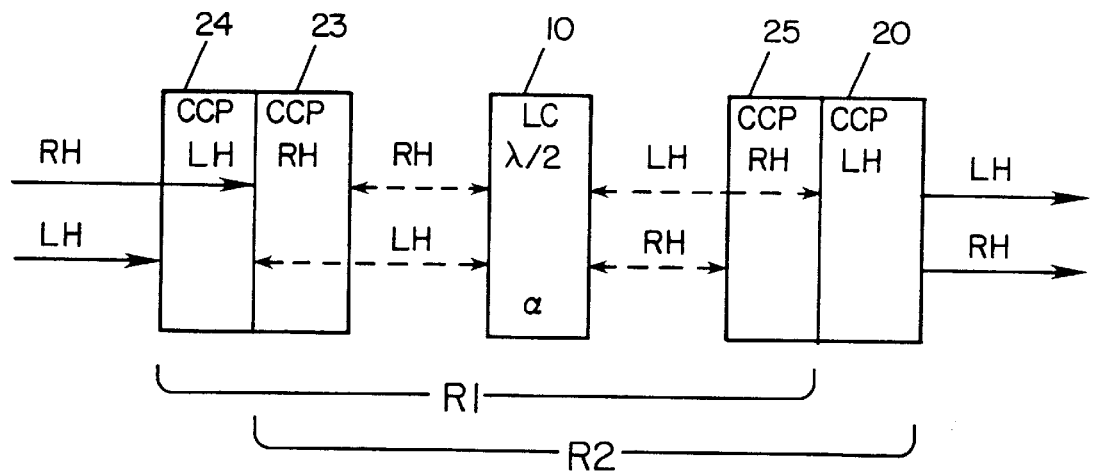
FIGS. 15a–b, is two nested Fabry-Perot resonators using a single liquid crystal half-wave retarder in transmission mode (FIG. 15a) and in reflection mode (FIG. 15b).

Two resonators can be nested together and can use a single liquid crystal half-wave retarder (FIG. 15a). The nested device employs both a right-handed and a left-handed CCP on each side of a liquid crystal half-wave plate. Right-handed CCP 23, half-wave plate 10 and left-handed CCP 20 form R1, a resonator for right-handed light, as previously illustrated in FIG. 9. Similarly, left-handed CCP 24, half-wave plate 10 and right-handed CCP 25 form R2, a resonator for left-handed light. In the resonator for right-handed light, CCP 25 acts as an isotropic layer and in the resonator for left-handed light, CCP 23 is an isotropic layer. Provided the absolute phase delays of CCPs 23 and 25 are equal, the round-trip fixed phase delays of the two cavities are equal. However, the variable phase delay of R1, acting on right-handed light, is $+4\alpha$ and the variable phase delay of R2, acting on left-handed light, is $-4\alpha$. Thus the two polarizations can be simultaneously tuned to different amplitudes or, for non-monochromatic light, to different wavelengths.

Figure 15B:
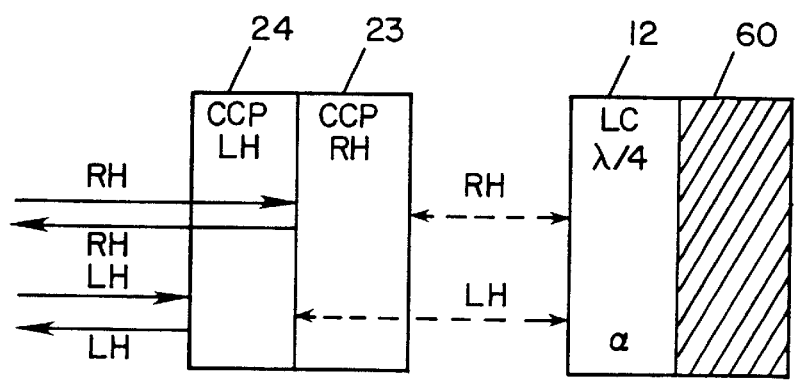

FIG. 15b is a reflection mode embodiment of FIG. 15a. Liquid crystal quarter-wave plate 12 and ordinary mirror 60 replace liquid crystal half-wave plate 10. A cavity for right-handed light is formed by right-handed CCP 23 and mirror 60, while a cavity for left-handed light is formed by left-handed CCP 24 and mirror 60. Both the active and passive phase delays of the two cavities are different.

The devices described above illustrate but do not limit the applications of the smectic liquid crystal phase modulator of this invention. Many variations and extensions of these embodiments will be readily apparent to those skilled in the art. For example, in any of the embodiments a single liquid-crystal half-wave plate can be replaced by two or more liquid crystal half-wave plates. The liquid crystal retarders can utilize any smectic liquid crystal with electro-optically rotatable orientation. The orientation can be discretely tunable between two or more states or can be tuned in an analog manner. The liquid crystal retarders can be constructed with flat plate substrates or as the active core within a fiber waveguide. Devices illustrated with right-handed light can alternatively be designed for left-handed light. Means for providing circularly polarized light can be included in the devices. Reflection-mode only devices and polarization-independent devices can be constructed. In the devices illustrated, the wavelengths of incident light fall within the reflection bands of the CCPs. This can be achieved by using more than one CCP to cover the wavelengths of interest. Additionally, color filtering can be combined with phase modulation by selecting a CCP which does not reflect all incident wavelengths. These and other variations fall within the spirit and scope of this invention.

We claim:

1. A liquid crystal optical modulator for receiving at least partially circularly polarized input light and modulating the phase of the input light, comprising:

a first liquid crystal half-wave retarder having a rotatable optic axis for receiving the input light, imparting an absolute phase delay on the input light, and imparting an additional variable phase delay that is a function of an orientation of the rotatable optic axis;

a first cholesteric liquid crystal circular polarizer of a first handedness, positioned such that it receives phase delayed light from the first liquid crystal half-wave retarder, reflects a component of the phase delayed light having the first handedness back to the first liquid crystal half-wave retarder, and transmits other components of the phase delayed light; and electric field means for rotating said optic axis of said first liquid crystal half-wave retarder;

wherein rotation of said optic axis modulates the phase of light exiting said optical modulator.

2. The optical modulator of claim 1 wherein said cholesteric liquid crystal is a polymeric cholesteric liquid crystal.

3. The optical modulator of claim 1 wherein said cholesteric liquid crystal comprises a plurality of cholesteric liquid crystal materials, each of said materials having a different reflection band.

4. The optical modulator of claim 1 wherein said first liquid crystal half-wave retarder is an achromatic half-wave retarder.

5. The optical modulator of claim 1 further comprising a passive retarder positioned adjacent to said first liquid crystal half-wave retarder to form a compound achromatic half-wave retarder.

6. The optical modulator of claim 1 further comprising a circular polarizer positioned on the opposite side of said first liquid crystal half-wave retarder from said first cholesteric circular polarizer.

7. The optical modulator of claim 1 further comprising a second cholesteric liquid crystal circular polarizer of said second handedness, positioned on the opposite side of said first liquid crystal half-wave retarder from said first cholesteric circular polarizer.

8. The optical modulator of claim 7 further comprising a second liquid crystal half-wave retarder having a rotatable optic axis and positioned on the opposite side of said second cholesteric circular polarizer from said first liquid crystal half-wave retarder.

9. The optical modulator of claim 7 wherein said first handedness is the same as said second handedness.

10. The optical modulator of claim 7 wherein said second handedness is the opposite of said first handedness.

11. The optical modulator of claim 10 wherein said first and second cholesteric circular polarizers form a resonance cavity for circularly polarized light incident on one of said cholesteric circular polarizers, said light having the same handedness as the cholesteric circular polarizer on which said light is incident.

12. The optical modulator of claim 11 wherein said liquid crystal retarder comprises a smectic liquid crystal retarder selected from the group consisting of planar-aligned SmA*, planar aligned SmC*, distorted helix ferroelectric, antiferroelectric and achiral ferroelectric liquid crystals.

13. The optical modulator of claim 11 further comprising a second liquid crystal half-wave retarder having a rotatable optic axis and positioned on the opposite side of said first cholesteric circular polarizer from said first liquid crystal half-wave retarder, and a third cholesteric liquid crystal circular polarizer of a third handedness, positioned on the opposite side of said second liquid crystal half-wave retarder from said first cholesteric circular polarizer.

14. The optical modulator of claim 11 further including a third cholesteric liquid crystal circular polarizer of a third handedness positioned on the opposite side of said first cholesteric circular polarizer from said first liquid crystal half-wave retarder, a second liquid crystal half-wave retarder having a rotatable optic axis and positioned on the opposite side of said third cholesteric circular polarizer from said first cholesteric circular polarizer, and a fourth cholesteric liquid crystal circular polarizer of a fourth handedness positioned on the opposite side of said second liquid crystal half-wave retarder from said third cholesteric circular polarizer.

15. The optical modulator of claim 11 further including a third cholesteric liquid crystal circular polarizer of a third handedness positioned between said first liquid crystal half-wave retarder and said first cholesteric circular polarizer, and a fourth cholesteric liquid crystal circular polarizer of a fourth handedness positioned on the opposite side of said second cholesteric circular polarizer from said first liquid crystal half-wave retarder.

16. The optical modulator of claim 7 wherein said first and second cholesteric liquid crystals are polymeric cholesteric liquid crystals.

17. The optical modulator of claim 7 further comprising a second liquid crystal half-wave retarder having rotatable axis and positioned between said first smectic liquid crystal half-wave retarder and said second cholesteric circular polarizer, and wherein said first handedness is the same as said second handedness.

18. The optical modulator of claim 1 wherein said first liquid crystal half-wave retarder is comprised of a liquid crystal quarter-wave retarder having a rotatable optic axis and a reflector, said reflector positioned on the opposite side of said liquid crystal quarter-wave retarder from said first cholesteric circular polarizer.

19. The optical modulator of claim 18 wherein said reflector and said first cholesteric circular polarizer form a resonance cavity for circularly polarized light incident on said first cholesteric circular polarizer, said light having the same handedness as said first cholesteric circular polarizer.

20. The optical modulator of claim 1 further including a linear polarizer positioned on the opposite side of said first liquid crystal half-wave retarder from said cholesteric circular polarizer, and further including a reflector positioned on the opposite side of said cholesteric circular polarizer from said first liquid crystal half-wave retarder.

* * * * *